United States Patent [19]
Ciaglo

[11] Patent Number: 5,970,693
[45] Date of Patent: Oct. 26, 1999

[54] FILAMENT EMPLOYING LAWNMOWER BLADE APPARATUS

[76] Inventor: Walter M. Ciaglo, 308 Caswell St., East Taunton, Mass. 02718

[21] Appl. No.: 09/144,606

[22] Filed: Aug. 31, 1998

[51] Int. Cl.$^6$ .................................................. A01D 55/18
[52] U.S. Cl. .............................................. 56/12.7; 30/276
[58] Field of Search ............................. 30/276, 347, 348; 56/12.7, 255, 295, 12.1, 16.7, 17.5, DIG. 17, DIG. 20, 16.9; 411/399, 400

[56] References Cited

U.S. PATENT DOCUMENTS

| | | |
|---|---|---|
| 4,112,653 | 9/1978 | Ballas et al. . |
| 4,201,034 | 5/1980 | Frantello . |
| 4,374,465 | 2/1983 | Comer ...................................... 56/12.7 |
| 4,726,176 | 2/1988 | McGrew . |
| 4,819,416 | 4/1989 | Jones . |
| 4,962,630 | 10/1990 | Jones ....................................... 56/12.7 |
| 5,065,566 | 11/1991 | Gates ....................................... 56/12.7 |
| 5,313,770 | 5/1994 | Smothers ................................. 56/12.7 |
| 5,701,728 | 12/1997 | Koks et al. .............................. 56/12.7 |
| 5,713,191 | 2/1998 | Welton . |

Primary Examiner—Robert E. Pezzuto

[57] ABSTRACT

A filament employing lawnmower blade apparatus includes a support disc which includes a central transverse lawnmower connection channel and a plurality of peripheral transverse fastener reception channels. A plurality of filament reception fasteners are provided each of which includes a fastener head, a filament reception channel located adjacent to the fastener head, a threaded shaft located adjacent to the fastener head, and a threaded nut screwed onto the shaft. A plurality of filaments are received in the respective filament reception channels of the filament reception fasteners. For each of the filament reception fasteners, the fastener head and the shaft are arrayed along a fastener longitudinal axis, and the filament reception channel extends perpendicular to the fastener longitudinal axis. Washers are located on the shafts of the filament reception fasteners between the nuts and the support disc. The filament reception channel includes exterior walls which are arrayed in a polygonal pattern. The fastener reception channel is also in a form of a polygonal pattern. The polygonal pattern of the exterior walls of each of the filament reception channels is a complementary pattern to the polygonal pattern of the fastener reception channels. The polygonal pattern of the exterior walls of the filament reception channel and the polygonal pattern of the fastener reception channel are in forms of a four-sided square.

3 Claims, 3 Drawing Sheets

FILAMENT EMPLOYING LAWNMOWER BLADE APPARATUS

BACKGROUND OF THE INVENTION

1. Field of the Invention

The present invention relates generally to power lawnmowers and, more particularly, to power lawnmowers which employ cutting blades made of filaments.

3. Description of the Prior Art

The use of power lawnmowers that employ filaments for cutting blades is well known in the art. In this respect, throughout the years, a number of innovations have been developed relating to filament based cutting blades for lawnmowers, and the following U. S. patents are representative of some of those innovations: U.S. Pat. Nos. 4,112,653, 4,201,034, 4,726,176, 4,819,416, and 5,713,191. More specifically, U.S. Pat. No. 4,112,653 discloses a filament cutting blade for a lawnmower that is retained on a support disc by centrifugal force on the disc as the disc spins. Because the degree of centrifugal force varies with the rate of spin of the disc, it would be desirable if filaments were secured to a support disc in a manner which does not rely upon the use of centrifugal force on the disc.

U.S. Pat. No. 4,201,034 discloses a lawnmower that employs plural reels of filaments. Because of their complexity and their weight, it would be desirable if a lawnmower employed filaments without employing plural reels of filaments supported on a disc.

U.S. Pat. No. 4,726,176 discloses a lawnmower that has a disc that has horizontal grooves for receiving filaments. Once grooves are machined into a filament retaining disc, there is a substantial risk that the disc will be out of balance when it spins. Therefore, to avoid this risk, it would be desirable if a filament employing lawnmower were provided that does not employ a disc that has horizontal grooves machined into the disc for retaining the filaments.

U.S. Pat. No. 4,819,416 discloses a lawnmower that employs filaments attached to a disc that has pairs of adjacent vertical channels separated by a common wall. A filament is threaded in through one channel, around the common wall, and out through the second channel. With this device, two vertical channels are required for each filament that is employed. Also, the filament must be threaded into and out from the two vertical channels. To avoid the duplication, it would be desirable if a lawnmower that employs filaments were provided that does not employ two vertical channels for each filament that is employed. In addition, it would be desirable if a filament-employing lawnmower were provided that does not require a filament to be threaded into and out from a supporting disc.

U.S. Pat. No. 5,713,191, in a manner similar to above-mentioned U.S. Pat. No. 4,819,416, discloses a lawnmower disc that supports filaments by having the filaments threaded through pairs of adjacent vertical channels in the disc.

Still other features would be desirable in a filament employing lawnmower blade apparatus. For example, rather than having pairs of adjacent vertical channels for supporting a single filament in a disc, it would be desirable if a lawnmower disc had only one vertical disc channel for supporting each filament. In addition, rather than machining a lawnmower disc in a complex way to receive a filament, it would be desirable if the lawnmower disc were machined simply to receive a fastener, and the fastener is provided with a filament receiving channel.

Thus, while the foregoing body of prior art indicates it to be well known to use lawniowers that employ filaments for cutting blades, the prior art described above does not teach or suggest a filament employing lawnmower blade apparatus which has the following combination of desirable features: (1) has filaments secured to a support disc in a manner which does not rely upon the use of centrifugal force on the disc; (2) employs filaments without employing plural reels of filaments supported on a disc; (3) dies not employ a disc that has horizontal grooves machined into the disc for retaining the filaments; (4) does not employ two vertical channels for each filament that is employed; (5) does not require a filament to be threaded into and out from a supporting disc; (6) has only one vertical disc channel for supporting each filament; and (7) has a lawnmower disc that is machined simply to receive a fastener, and the fastener is provided with a filament receiving channel. The foregoing desired characteristics are provided by the unique filament employing lawnmower blade apparatus of the present 20 invention as will be made apparent from the following description thereof. Other advantages of the present invention over the prior art also will be rendered evident.

SUMMARY OF THE INVENTION

To achieve the foregoing and other advantages, the present invention, briefly described, provides a filament employing lawnmower blade apparatus which includes a support disc which includes a central transverse lawnmower connection channel and a plurality of peripheral transverse fastener reception channels. A plurality of filament reception fasteners are provided each of which includes a fastener head, a filament reception channel located adjacent to the fastener head, a threaded shaft located adjacent to the fastener head, and a threaded nut screwed onto the shaft. A plurality of filaments are received in the respective filament reception channels of the filament reception fasteners. For each of the filament reception fasteners, the fastener head and the shaft are arrayed along a fastener longitudinal axis, and the filament reception channel extends perpendicular to the fastener longitudinal axis. Washers are located on the shafts of the filament reception fasteners between the nuts and the support disc.

The filament reception channel includes exterior walls which are arrayed in a polygonal pattern. The fastener reception channel is also in a form of a polygonal pattern. The polygonal pattern of the exterior walls of each of the filament reception channels is a complementary pattern to the polygonal pattern of the fastener reception channels. The polygonal pattern of the exterior walls of the filament reception channel and the polygonal pattern of the fastener reception channel are in forms of a four-sided square.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved filament employing lawnmower blade apparatus which has all of the advantages of the prior art and none of the disadvantages.

It is another object of the present invention to provide a new and improved filament employing lawnmower blade apparatus which may be easily and efficiently manufactured and marketed.

It is therefore object of the present invention to provide a new and improved filament employing lawnmower blade apparatus which is of durable and reliable construction.

An even further object of the present invention is to provide a new and improved filament employing lawnmower blade apparatus which is susceptible of a low cost of manufacture with regard to both materials and labor, and which accordingly is then susceptible of low prices of sale to the consuming public, thereby making such filament employing lawnmower blade apparatus available to the buying public.

Still yet a further object of the present invention is to provide a new and improved filament employing lawnmower blade apparatus which has filaments secured to a support disc in a manner which does not rely upon the use of centrifugal force on the disc.

Still another object of the present invention is to provide a new and improved filament employing lawnmower blade apparatus that employs filaments without employing plural reels of filaments supported on a disc.

Yet another object of the present invention is to provide a new and improved filament employing lawnmower blade apparatus which dies not employ a disc that has horizontal grooves machined into the disc for retaining the filaments.

Even another object of the present invention is to provide a new and improved filament employing lawnmower blade apparatus that does not employ two vertical channels for each filament that is employed.

Still a further object of the present invention is to provide a new and improved filament employing lawnmower blade apparatus which does not require a filament to be threaded into and out from a supporting disc.

Yet another object of the present invention is to provide a new and improved filament employing lawnmower blade apparatus that has only one vertical disc channel for supporting each filament.

Still another object of the present invention is to provide a new and improved filament employing lawnmower blade apparatus which has a lawnmower disc that is machined simply to receive a fastener, and the fastener is provided with a filament receiving channel.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved filament employing lawnmower blade apparatus embodying the principles and concepts of the present invention will be described.

Figure 1:
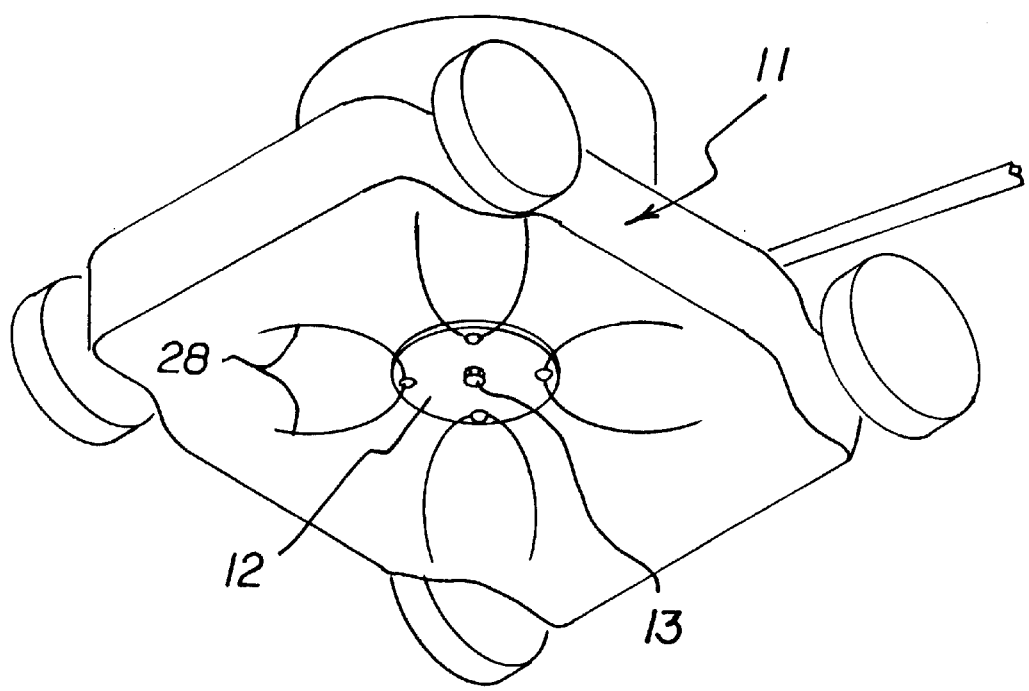
FIG. 1 is a bottom perspective view showing a preferred embodiment of the filament employing lawnmower blade apparatus of the invention installed on a power lawnmower.
Figure 2:
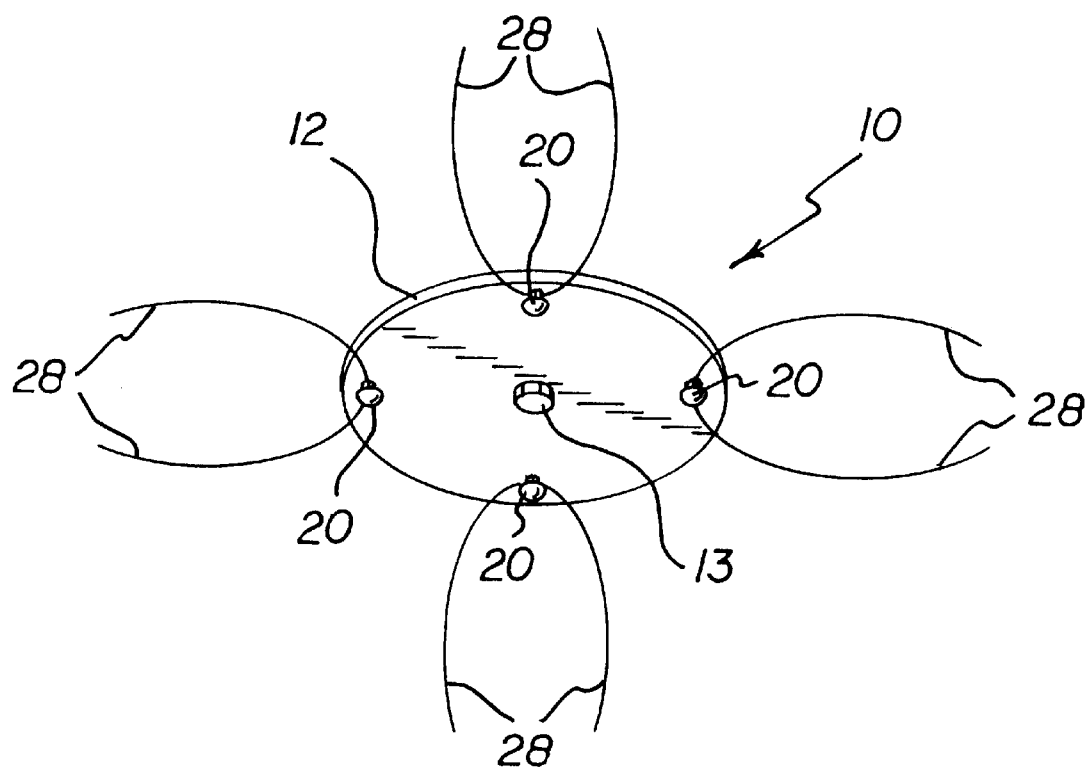
FIG. 2 is an enlarged bottom perspective view of the embodiment of the filament employing lawnmower blade apparatus shown in FIG. 1 removed from the power lawnmower.
Figure 3:
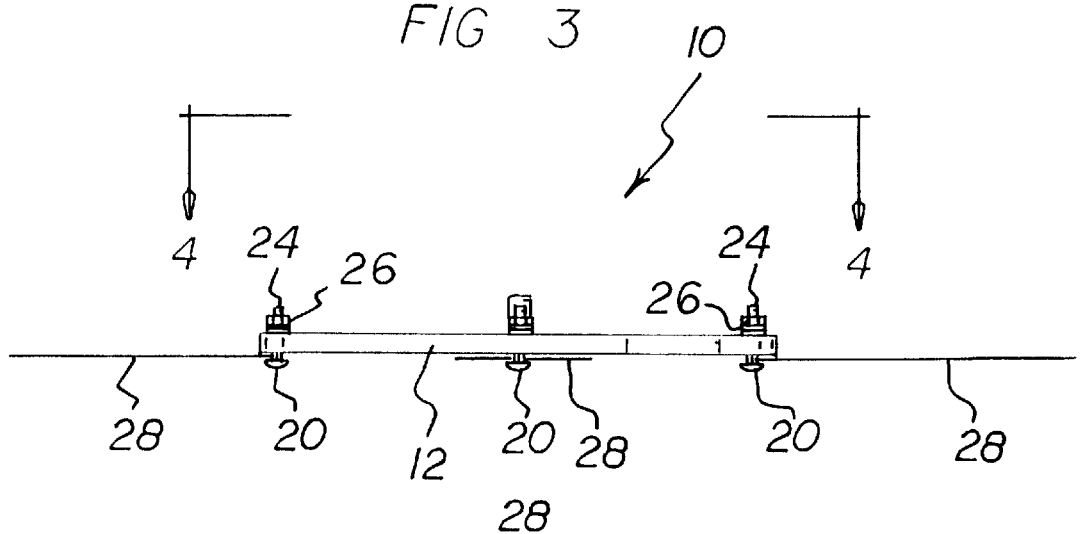
FIG. 3 is a side view of the embodiment of the filament employing lawnmower blade apparatus of FIG. 2.
Figure 4:
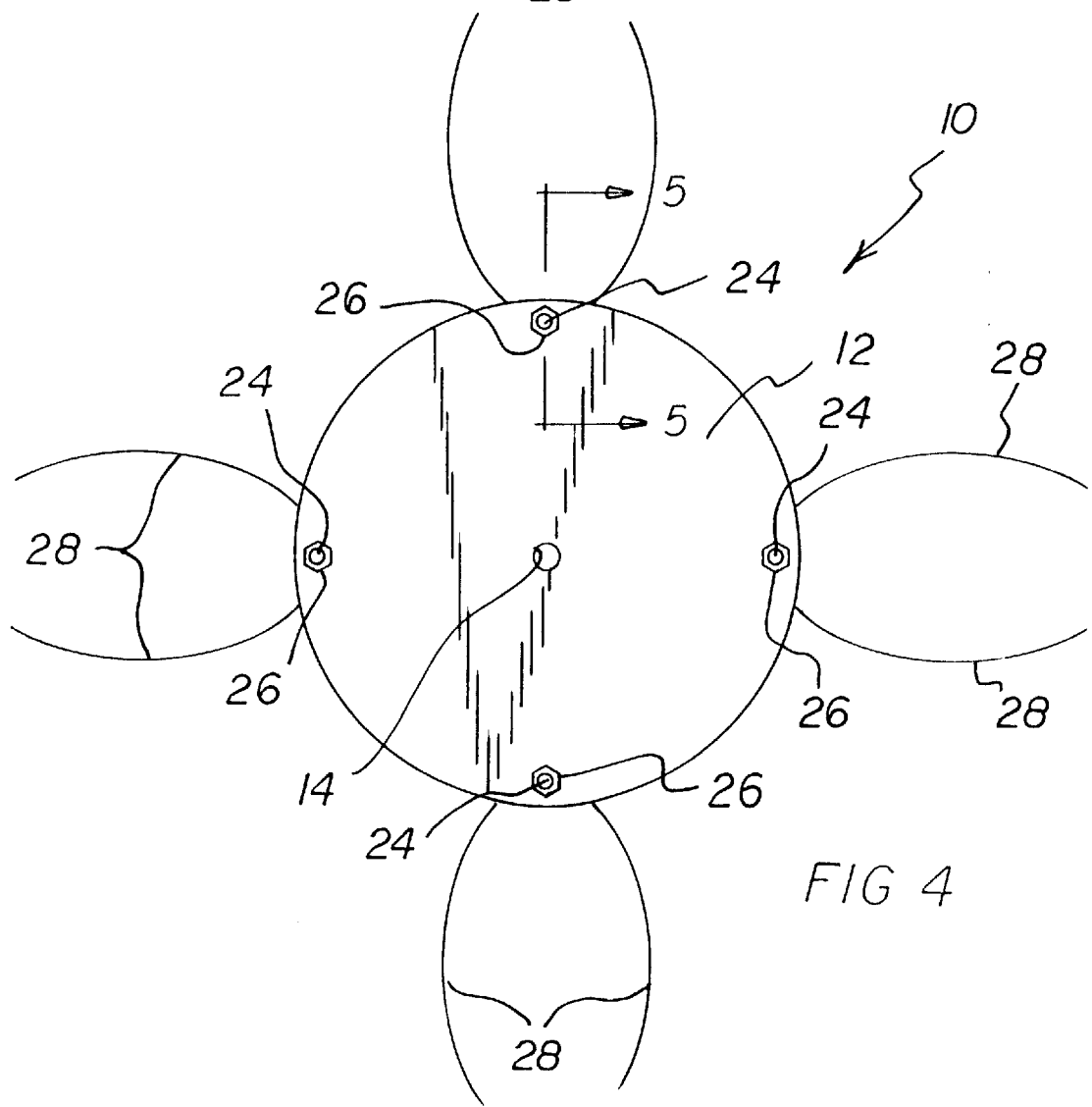
FIG. 4 is a top view of the embodiment of the invention shown in FIG. 3 taken along line 4—4 thereof.
Figure 5:
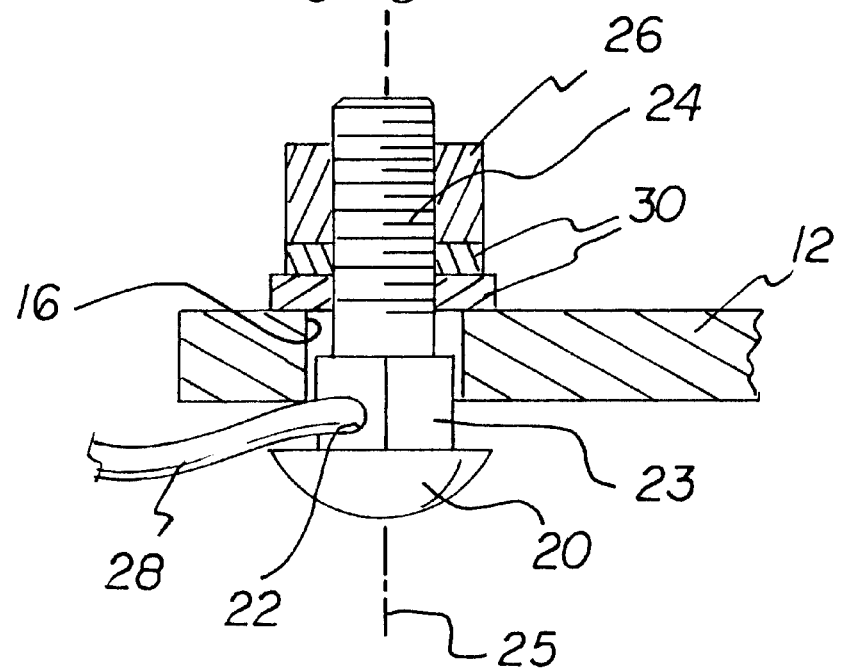
FIG. 5 is an enlarged cross-sectional view of the embodiment of the invention shown in FIG. 4 taken along line 5—5 thereof.
Figure 6:
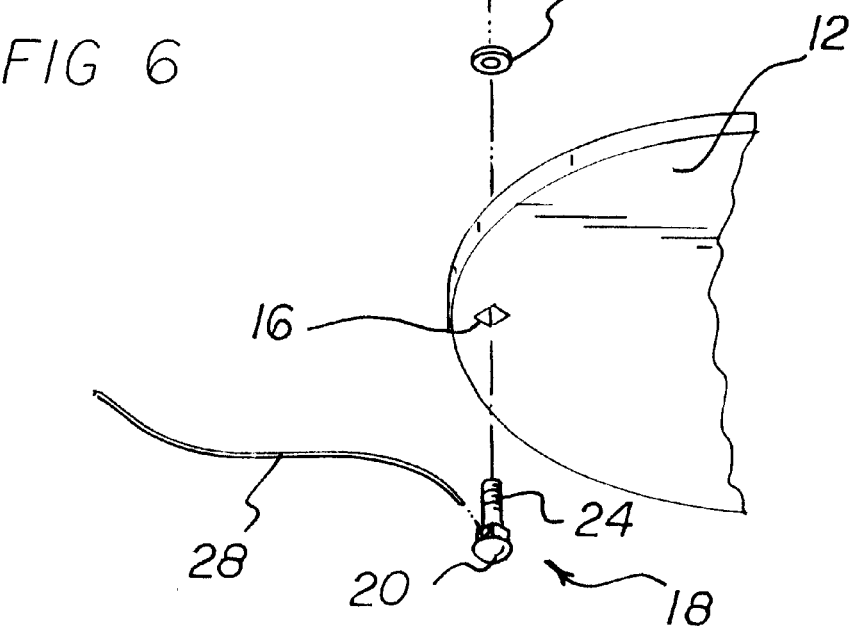
FIG. 6 is an exploded perspective view of the portion of the embodiment of the invention shown in FIG. 5.

Turning to FIGS. 1–6, there is shown an exemplary embodiment of the filament employing lawnmower blade apparatus of the invention generally designated by reference numeral 10. In its preferred form, filament employing lawnmower blade apparatus 10 includes a support disc 12 which includes a central transverse lawnmower connection channel 14 and a plurality of peripheral transverse fastener reception channels 16. A plurality of filament reception fasteners 18 are provided each of which includes a fastener head 20, a filament reception channel 22 located adjacent to the fastener head 20, a threaded shaft 24 located adjacent to the fastener head 20, and a threaded nut 26 screwed onto the shaft 24. A plurality of filaments 28 are received in the respective filament reception channels 22 of the filament reception fasteners 18. For each of the filament reception fasteners 18, the fastener head 20 and the shaft 24 are arrayed along a fastener longitudinal axis 25, and the filament reception channel 22 extends perpendicular to the fastener longitudinal axis 25. Washers 30 are located on the shafts 24 of the filament reception fasteners 18 between the nuts 26 and 20 the support disc 12.

The filament reception channel 22 includes exterior walls 23 which are arrayed in a polygonal pattern. The fastener reception channel 16 is also in a form of a polygonal pattern. The polygonal pattern of the exterior walls 23 of each of the filament reception channels 22 is a complementary pattern to the polygonal pattern of the fastener reception channels 16. The polygonal pattern of the exterior walls 23 of the filament reception channel 22 and the polygonal pattern of the fastener reception channel 16 are in forms of a four-sided square.

To use the filament employing lawnmower blade apparatus 10 of the invention, for each filament reception channel 22, a filament 28 is threaded therethrough. More specifically, a filament 28 is threaded through a filament reception channel 22 so that approximately one-half of the filament 28 extends out from each end of the filament reception channel 22. Then, for each filament reception fastener 18, the shaft 24 is passed through the fastener reception channel 16 from the bottom side to the top side. Then, washers 30 are placed around the shaft 24, and the nut 26 is screwed onto the shaft 24. The nut 26 is tightened so that the portions of the filaments 28 adjacent to the fastener heads 20 and the support disc 12 are squeezed or clamped between the respective fastener heads 20 and the support disc 12.

Then, the lawnmower connection channel 14 is fitted onto a drive shaft of a lawnmower motor and secured thereto with a disc-to-drive-shaft nut 13. Then, when the lawnmower is turned on and the support disc 12 rotates with the motor drive shaft, the filaments 28 serve as foliage cutters.

Filaments 28 can easily be replaced by simply loosening the nuts 26, removing the filament reception fasteners 18 from the fastener reception channels 16, removing the existing filaments 28 from the filament reception channels 22, and installing different filaments 28. Filaments 28 can be replaced depending upon desired thickness, length, and material of composition of the filaments 28. The filaments 28 can be made from a plurality of individual monofilaments. Alternatively, the filaments 28 can be made from single-stranded metal wire material. As shown in the drawing Figures, the filaments 28 can be C-shaped filaments 28 made from wire material that retains its C-shaped before and after use.

The components of the filament employing lawnmower blade apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved filament employing lawnmower blade apparatus that is low in cost, relatively simple in design and operation, and which may advantageously be used to secure filaments to a support disc in a manner which does not rely upon the use of centrifugal force on the disc. With the invention, a filament employing lawnmower blade apparatus is provided which employs filaments without employing plural reels of filaments supported on a disc. With the invention, a filament employing lawnmower blade apparatus is provided which dies not employ a disc that has horizontal grooves machined into the disc for retaining the filaments. With the invention, a filament employing lawnmower blade apparatus is provided which does not employ two vertical channels for each filament that is employed. With the invention, a filament employing lawnmower blade apparatus is provided which does not require a filament to be threaded into and out from a supporting disc. With the invention, a filament employing lawnmower blade apparatus is provided which has only one vertical disc channel for supporting each filament. With the invention, a filament employing lawnmower blade apparatus is provided which has a lawnmower disc that is machined simply to receive a fastener, and the fastener is provided with a filament receiving channel.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A filament employing lawnmower blade apparatus, comprising:

a support disc which includes a central transverse lawnmower connection channel defining a central axis, a radially spaced outer peripheral edge, and a plurality of peripheral transverse fastener reception channels located proximal to said outer peripheral edge, each of said peripheral transverse fastener reception channels extending through said disc along an axis substantially parallel to said central axis, a plurality of filament reception fasteners, each adapted to be received in a corresponding peripheral transverse fastener reception channel, respectively, wherein at least one of said filament reception fasteners includes a fastener head, a fastener head body portion located adjacent to said fastener head, a filament reception channel extending through said fastener head body portion, a threaded shaft located adjacent to said fastener head body portion, and a threaded nut adapted to be screwed onto said threaded shaft, and a filament adapted to be received in said filament reception channel of said at least one filament reception fastener, wherein said fastener head, said fastener head body portion, and said threaded shaft of said at least one filament reception fastener are arrayed along a fastener longitudinal axis, said filament reception fastener longitudinal axis being radially spaced from said central transverse lawnmower connection channel and being located proximal to said outer peripheral edge when said at least one filament reception fastener is received in its corresponding peripheral transverse fastener reception channel, and wherein said fastener head body portion includes exterior walls which are arrayed in a polygonal pattern such that said filament reception channel extends through a pair of opposed exterior walls thereof and is disposed substantially perpendicular to said fastener longitudinal axis, and wherein said fastener reception channel is in the form of a polygonal pattern complimentary to the polygonal pattern defined by said fastener head body portion.

2. The apparatus of claim 1, further including:

a washer adapted to be located on said shaft of said at least one filament reception fastener between said nut and said support disc.

3. The apparatus of claim 1 wherein said polygonal pattern of said exterior walls of said filament reception channel and said polygonal pattern of said fastener reception channel are in a form of a four-sided square.

* * * * *